UNITED STATES PATENT OFFICE.

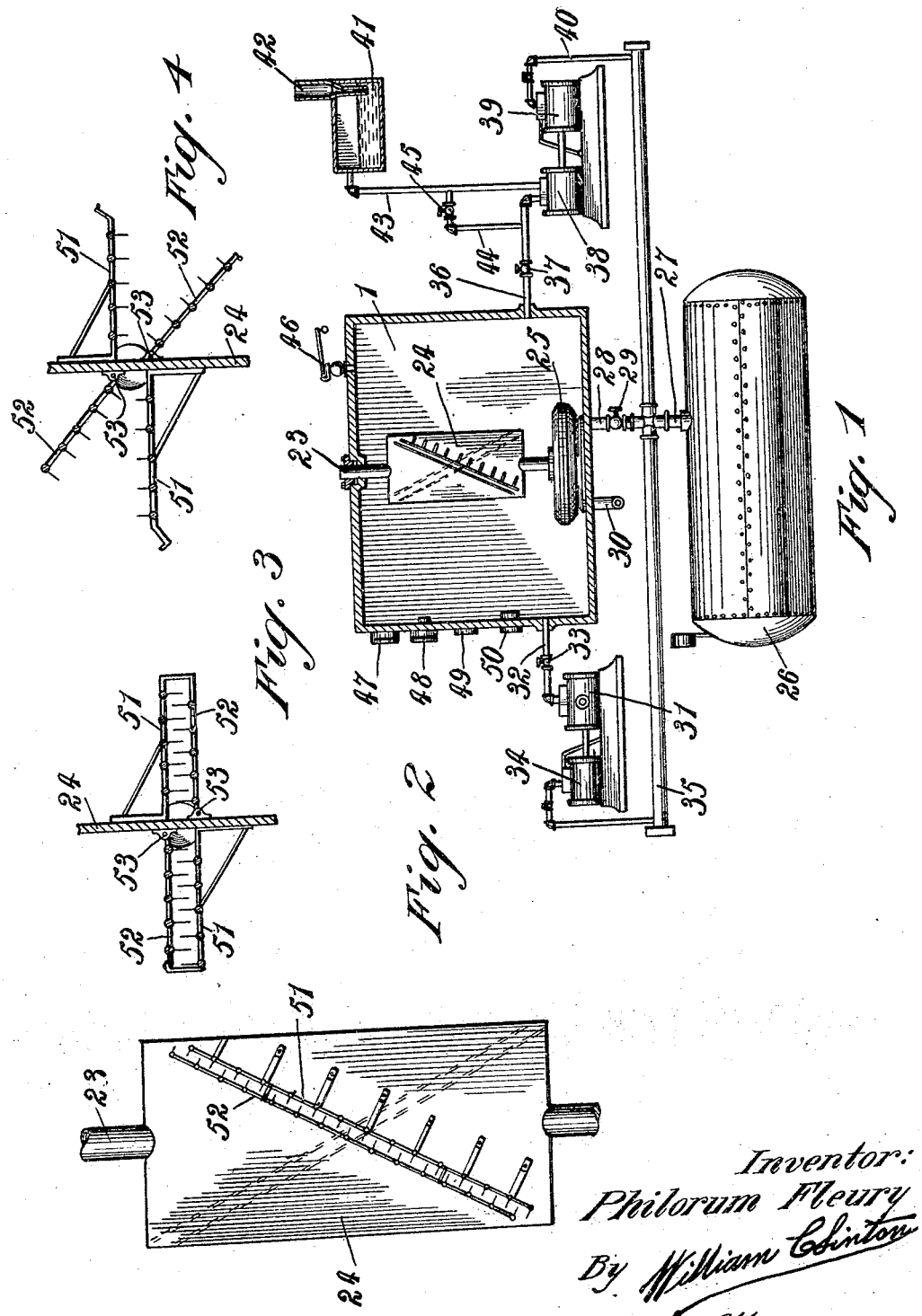

PHILORUM FLEURY, OF MONTREAL, QUEBEC, CANADA, ASSIGNOR OF ONE-HALF TO DAVID L. ROBERTSON, OF MONTREAL, QUEBEC, CANADA.

DRYING APPARATUS.

1,410,905.  Specification of Letters Patent.  Patented Mar. 28, 1922.

Original application filed November 21, 1919, Serial No. 339,701. Divided and this application filed November 20, 1920. Serial No. 425,416.

*To all whom it may concern:*

Be it known that I, PHILORUM FLEURY, a subject of the King of Great Britain, residing at Montreal, Province of Quebec, Canada, have invented certain new and useful Improvements in Drying Apparatus; and I do hereby declare that the following is a full, clear, and exact description of the invention, such as will enable others skilled in the art to which it appertains to make and use the same.

The present invention relates to apparatuses wherein large quantities of fish may be dried in a comparatively short time and is a division of my co-pending application filed November 21st, 1919, Serial No. 339,701.

One of the principal purposes of the present invention is to provide a drying apparatus of this character with means for holding a number of fish within the drying room.

A further object of the present invention is to provide a fish holding rack to be used in connection with such drying apparatuses whereby a number of fish may be sustained within a drying room and supported and retained in position with as little injury as possible to the fish.

The above and other objects will be readily ascertained from the description taken in connection with the accompanying drawings in which:

Figure 1 is a diagrammatical view of the apparatus embodying the preferred form of the invention;

Figure 2 is an enlarged detail side elevation of the fish support;

Figure 3 is a cross section of the same showing the fish holders in closed position; and, Figure 4 is a similar view showing the fish holders in opened position.

Referring now more particularly to the accompanying drawings wherein like and corresponding parts are designated by similar reference characters throughout the several views.

I have shown an entirely closed room or casing 1 having journaled therein a vertical shaft 23. This shaft is formed with a vertical rectangular plate 24. Supported within the room 1 is a steam turbine 25 and this turbine is connected to the shaft 23 so that upon the operation of the turbine the shaft 23 will be caused to rotate. The numeral 26 indicates the boiler of an ordinary steam generator and leading from this boiler is a pipe 27. Suitably connected to this pipe 27 is a pipe 28 leading to the turbine 25 and arranged within this pipe 27 is a valve 29. The steam from the tank 26 when permitted to enter the turbine 25 will cause the latter to revolve and the exhaust steam from this turbine may pass from the outlet pipe 30.

To create a vacuum within the room 1 a vacuum pump 31 is provided which is in communication with the room 1 by means of a pipe 32 and this pipe has a valve 33 arranged therein. A motor 34 is provided which is operatively connected to the vacuum pump for operating the same and a steam supply pipe 35 leads to this steam pump and is in communication with the pipe 27.

For supplying dry air to the room 1 a pipe 36 is provided having a valve 37 arranged therein and this pipe 36 is in communication with an air pump 38. Operatively connected to the air pump 38 is a motor 39 and leading from this motor 39 is a steam supply pipe 40 and this pipe is in communication with the pipe 27 leading from the boiler 26. A reservoir 41 is provided containing sulphuric acid or any other suitable drying agent and this reservoir 41 has an air inlet opening 42. Leading from the reservoir 41 is a pipe 43 which is in communication with the pump 38 and also in communication with the pipe 36 by means of the auxiliary pipe 44 and this auxiliary pipe has a valve 45 arranged therein.

In using the apparatus a vacuum can be created within the room 1 by means of the vacuum pump, but when creating a vacuum in the room 1 the valves 29 and 37 are closed so as to discontinue the rotation of the turbine 25 and the supply of air to the room 1. When a vacuum has been created and it is desired to admit dry air to this room, the valves 37 and 45 are opened and the dry air will immediately pass into the room. When the pressure within the room is equal to the outside pressure and it is desired to supply additional dry air to the room, the valve 45 is closed and the pump 38 set into operation, wherein the dry air will be forced into the room 1. When the compressed air within the room 1 has reached a desired degree the check valve 46 may open to permit the air from the casing 1 to escape, should too high a degree of pressure air be reached within the room. The numeral 47 indicates a barometer for indicating the outside pressure and 48 is a barometer for indicating the pressure within the room. The numeral 49 indicates an ordinary thermometer and 50 indicates a hydrometer for indicating the moisture contained within the room.

For supporting the fish upon each side of the plate 24, suitable racks or gripping members are employed, which securely hold the fish to the supporting plate and permit the fish to be revolved within the drying room. These racks each comprise two sections, one of which, indicated by the numeral 51, is stationary, whereas the other section 52 is pivotally connected as at 53 to the plate 24. Each of these sections consists of the upper and lower horizontal bars which are connected by a plurality of spaced parallel bars, and these parallel bars are provided with projecting fins or pins which are adapted to grip the fish whereby the latter will be retained between the sections of each rack. In supporting the fish upon the plate 24, they are suitably placed upon the gripping teeth or pins of the stationary rack section 51 and then are clamped or retained in position by means of the swinging sections 52. These sections are locked together, as is better illustrated in Figure 3 by means of the latch members 54. In this manner, the fish may be easily and readily removed from the racks with but little injury to the fish, but when once locked in position upon the racks, they will not become loose and when the racks are rotated, the water contained upon the fish will be forced therefrom by the centrifugal force.

Having thus fully described my invention, what I claim as new and desire to secure by Letters Patent is:—

1. An apparatus of the character described comprising a closed room, fish supporting racks arranged within said room, a turbine for rotating said racks, a vacuum pump communicating with said room, an air supply pipe communicating with said room, and a single steam generating set for operating said turbine, vacuum pump and drying air supply pump, substantially as and for the purpose specified.

2. A drying apparatus of the character described comprising a supporting shaft, a plate formed with said shaft, racks secured to each side of said plate, said racks comprising a stationary member and a pivotally mounted member, and means for locking said members together.

3. A fish support for drying apparatuses comprising a vertical supporting plate, racks secured to the opposite faces of said plate, said racks each consisting of a stationary and a movable section, and means for clamping such sections together.

4. A drying apparatus of the character described comprising a supporting plate, a rack secured to the opposite faces of said plate, each rack consisting of a stationary section and a swinging section, each section consisting of horizontal bars and vertical parallel bars, a plurality of pins formed with each vertical bar, and means for clamping said sections together.

In witness whereof I have hereunto set my hand.

PHILORUM FLEURY.